(12) United States Patent
Stahl

(10) Patent No.: US 12,478,569 B2
(45) Date of Patent: Nov. 25, 2025

(54) COMPOSITIONS METHODS AND DEVICE FOR ENHANCING DENTAL CARE BASED ON DEAD SEA SALT AND CANNABINOID OR EXTRACT OF CANNABIS PLANT

(71) Applicant: CANNIBITE BVBA, Mortsel (IL)

(72) Inventor: Veronica Stahl, Mortsel (IL)

(73) Assignee: CANNIBITE BVBA, Mortsel (IL)

( * ) Notice: Subject to any disclaimer, the term of this patent is extended or adjusted under 35 U.S.C. 154(b) by 666 days.

(21) Appl. No.: 17/616,379

(22) PCT Filed: Jun. 3, 2020

(86) PCT No.: PCT/IL2020/050617
§ 371 (c)(1),
(2) Date: Dec. 3, 2021

(87) PCT Pub. No.: WO2020/245820
PCT Pub. Date: Dec. 10, 2020

(65) Prior Publication Data
US 2022/0323323 A1    Oct. 13, 2022

(30) Foreign Application Priority Data

Jun. 4, 2019 (IL) .......................................... 267081

(51) Int. Cl.
| | |
|---|---|
| *A61K 8/20* | (2006.01) |
| *A61K 8/19* | (2006.01) |
| *A61K 8/21* | (2006.01) |
| *A61K 8/29* | (2006.01) |
| *A61K 8/34* | (2006.01) |
| *A61K 8/43* | (2006.01) |
| *A61K 8/60* | (2006.01) |
| *A61K 8/64* | (2006.01) |
| *A61K 8/73* | (2006.01) |
| *A61K 8/81* | (2006.01) |
| *A61K 8/86* | (2006.01) |
| *A61K 8/9789* | (2017.01) |
| *A61Q 11/00* | (2006.01) |

(52) U.S. Cl.
CPC ............... *A61K 8/347* (2013.01); *A61K 8/19* (2013.01); *A61K 8/21* (2013.01); *A61K 8/29* (2013.01); *A61K 8/43* (2013.01); *A61K 8/606* (2013.01); *A61K 8/64* (2013.01); *A61K 8/731* (2013.01); *A61K 8/8176* (2013.01); *A61K 8/86* (2013.01); *A61K 8/9789* (2017.08); *A61Q 11/00* (2013.01); *A61K 2800/28* (2013.01); *A61K 2800/48* (2013.01)

(58) Field of Classification Search
None
See application file for complete search history.

(56) References Cited

U.S. PATENT DOCUMENTS

| | | | |
|---|---|---|---|
| 2016/0166498 A1* | 6/2016 | Anastassov | ............ A61K 8/731 424/58 |
| 2018/0344594 A1* | 12/2018 | Maddahi | ............... A61K 8/9794 |
| 2024/0091131 A1* | 3/2024 | Arora | ....................... A61K 8/37 |

FOREIGN PATENT DOCUMENTS

| | | |
|---|---|---|
| WO | 2019/030762 | 2/2019 |
| WO | 2019/069312 | 4/2019 |

OTHER PUBLICATIONS

International Search Report and Written Opinion corresponding to International Patent Application No. PCT/IL2020/050617, mailed Aug. 14, 2020.

* cited by examiner

*Primary Examiner* — Brian Gulledge

(74) *Attorney, Agent, or Firm* — S.J. Intellectual Property LTD.

(57) ABSTRACT

The invention provides certain compositions and methods for dental care, which alone or in combination with other dental technologies can help to achieve better outcomes in terms of the enhancement of oral hygiene as regards to preservation of the healthy oral and/or dental flora, minimization or a reduction of the proportion of harmful bacteria, and further facilitate the enhancement of a more healthy appearance of teeth and gums. The oral formulation for improving oral and/or dental hygiene, and/or for enhancing the healthy appearance of teeth and gums, comprises Dead Sea salt and at least one synthetic, semi-synthetic or natural cannabinoid, a precursor, a derivative, or any combination thereof, or an extract of a cannabis plant.

16 Claims, 5 Drawing Sheets

COMPOSITIONS METHODS AND DEVICE FOR ENHANCING DENTAL CARE BASED ON DEAD SEA SALT AND CANNABINOID OR EXTRACT OF CANNABIS PLANT

CROSS-REFERENCE TO RELATED APPLICATIONS

The present application is a National Phase Entry of PCT International Application No. PCT/IL2020/050617 which was filed on Jun. 3, 2020, which claims priority to Israeli Patent Application No. 267081, filed Jun. 4, 2019, all of which are hereby incorporated by reference in their entireties.

TECHNOLOGICAL FIELD

The invention generally pertains to the field of dental care and particularly to preventive dentistry, and also cosmetic or esthetic dentistry in promoting oral hygiene and the appearance of teeth and gums.

BACKGROUND

Nearly all dental disease, most commonly dental cavities (or dental caries), gingivitis, periodontal (gum) diseases, and bad breath (or halitosis), ensues from imbalance of oral microbial flora or oral microbiome. In a healthy adult, billions of bacteria, viruses, and fungi reside within the oral cavity and represent more than 800 different species.

Dental disease is preventable, and the most important factor, by far, is maintenance of effective daily oral hygiene. Preventive dental care consists of a number of regular dental routines (e.g., brushing, flossing, eating a healthy diet and routine visits to a dentist). Practicing these simple steps should help to maintain oral health and prevent the development of tooth decay, gum disease and a range of systemic diseases.

Restorative or curative dentistry generally involves repair of diseased or abnormal teeth, and restoration to their normal function, as opposed to cosmetic dentistry which is directed to an improved appearance of teeth. Cosmetic procedures include tooth-colored fillings, teeth whitening, veneers, bonding and gum lifts. There is some overlap, however, between the restorative and cosmetic treatments. Significant technological advancements have been made in both these areas that made dental treatments more reliable and durable.

Out of hundreds of bacterial species colonizing the mouth, only a limited number have been implicated in dental decay (caries) or periodontal disease. The main cause of dental decay is *Streptococcus mutans*, while various lactobacilli are responsible for its progression. Periodontal infections are usually mixed, most often involving anaerobes such as *Treponema denticola* and *Porphyromonas gingivalis*.

Candidiasis (oral thrush) is the most common oral fungal infection, especially in children and immunocompromised individuals. Non-candidal oral infections are also known, although are less common, as primary lesions or oral manifestations of systemic mycoses.

Oral viral infections are also encountered in dental practice, but with a lesser frequency. Members of the human herpesvirus (HHV) and human papillomavirus (HPV) families cause the most common primary viral infections of the oral cavity.

Dental infections rank as the most universal affliction in human species. Despite their non-life-threatening nature, the discomfort caused by these infections and their cost, in the US dental infections rank third in medical costs, behind heart disease and cancer, they are given a particular prominence in population health care.

Despite the fact that today's consumer is faced with multiplicity of dental appliances (e.g., toothbrushes, toothpastes, mouthwashes and other aids), and that many people use these products diligently, dental disease remains highly widespread even in industrial countries, across cultural boundaries and socio-economic groups. Thus there remains an unmet need for lower-cost, better-performing products and methods in this area.

A number of studies demonstrated that certain extracts of *Cannabis*, predominantly of *Cannabis sativa* L., possess antibacterial activities against various pathogenic bacteria and also some fungi. It was later demonstrated that these antimicrobial effects are specific to ethanol and petroleum extracts, and are absent in aqueous extracts [1]. More recently these effects were narrowed to the lipophilic constituents, such as cannabinoids and terpenes, and in particular to the two major cannabinoids, the $\Delta 9$-Tetrahydrocannabinol (THC) and Cannabidiol (CBD). It is now known that all five major cannabinoids, THC, CBD, and also Cannabigerol (CBG), Cannabichromene (CBC), Cannabinol (CBN) and also certain new synthetic cannabinoids are capable of exerting antimicrobial activities against specific strains of bacteria and fungi, e.g., methicillin-resistant *Staphylococcus aureus* (MRSA) [2-3]. There is an open question, however, as to how these findings can be applied to dental care.

Certain oral care compositions comprising cannabinoids were described in U.S. Ser. No. 10/172,786, and also in WO2019030762 and WO2019069312 by the present inventor.

REFERENCES

1. Wasim K et al, Antimicrobial studies of the leaf of *Cannabis sativa* L, Pak J Pharm Sc, 8, 1995, 29-38.
2. Radwan M M et al Biologically active cannabinoids from high-potency *Cannabis sativa*, J Nat Prod, 72, 2009, 906-911.
3. Appendino G et al, Antibacterial cannabinoids from *Cannabis sativa*: A structure-activity study, J Nat Prod, 71, 2008, 1427-1430.

GENERAL DESCRIPTION

The main objective of the present invention is to provide a comprehensive solution to dental care. Dental care is a broad term encompassing herein curative and preventive dentistry in terms of alleviation and prevention of gum disease, cavities, enamel wear, etc., and also cosmetic dentistry in the sense of improving the healthy appearance of teeth (color, position, shape, size, alignment), gums and/or bite.

Dental care further refers herein to preservation or maintenance of oral hygiene. Oral hygiene, for the most part, is directed at controlling the composition of oral and/or dental flora and minimizing the population of harmful bacteria, viruses and fungi that are responsible for dental caries, gingivitis, periodontitis and other problems such as halitosis.

Dental plaque is a complex biofilm that forms on a tooth surface, with hundreds of microorganisms embedded in a matrix of host and microbial polymers. A plaque can also collect above or below gums (supra- or sub-gingival plaque). It constitutes a structurally and functionally organized, and species-rich microbial community. It is the major etiologic factor in the development of dental caries and periodontal diseases.

Bacterial species that are predominant in the diseased sites are different from the healthy sites. In caries, for example, there is a shift toward community dominance by acidogenic and acid-tolerating species such as mutant streptococci and lactobacilli. More importantly, microbial communities in biofilms can display enhanced pathogenicity (pathogenic synergism) and are less susceptible to antimicrobial agents.

It should be further noted that the makeup of oral and dental flora displays high degree of variability among individuals, and also in the same individual throughout lifetime. It is highly dependent individual physiological factors, disease diet, and other life-style related factors.

The present invention is based on surprising findings by the inventor that a combination of Dead Sea salts and cannabinoids provides a very effective antimicrobial agent, especially on the microbial flora characteristic of dental and gingival plaques. The combination of Dead Sea salts and cannabinoids was more effective in terms of reducing the number of bacterial colonies grown from a plaque than each of the two components when applied alone. Moreover, the combination was significantly more effective than other popular antiseptic products such as Listerine®, and also Corsodyl considered the gold standard for preventive dental care (Example 4).

The effectiveness of the Dead Sea salts and cannabinoid combination was further evident from the final concertation of the main actives, as the combination allowed to achieve a detectable antimicrobial effect with a significantly lower concertation of the two components, e.g., as low as up to 0.2% Dead Sea Salts and up to 0.01% cannabinoids (w/w). This phenomenon is illustrated in FIGS. 4-6 with the examples of at least two cannabinoids CBD and CBG. These findings are particularly attractive as they support the notion of a synergistic effect of the Dead Sea salts and cannabinoid combination on the reduction of the oral microbial flora, and minimization of its potentially harmful effects on teeth and gums.

Further, the composition of the Dead Sea salts and cannabinoids was found effective in a number of samples of oral plaques obtained from various individuals, or in other words, it was effective in samples with different content and composition of oral microbial flora. This finding is particularly surprising in view of the know extensive interindividual variability in the oral microbial flora.

The above findings gave rise to a number of prototype formulations serving as a basis for a wide range of oral and dental care products, with improved properties and more significant impact on the preservation and maintenance of healthy oral and dental flora. A shared feature of the formulations of the invention is the combination of Dead Sea salts and cannabinoids (e.g., CBD, CBG and others). The other components that are responsible for the texture, flavor, abrasiveness and other qualities can vary depending on the specific applications. To enhance certain qualities, the formulations of the invention can further include specific herbal extracts, whitening agents, antioxidants, nutrients, and other agents with beneficial effects on oral care, and health care in general.

The term Dead Sea salts generally denotes salts or mineral deposits extracted or obtained from the Dead Sea, i.e., the dry areas and wetland, and the body of water. In other words, it relates to a geographic origin of the salt, as opposed to an oceanic salt. It further denotes salts with a particularly high mineral content, which has been only partially characterized. In addition to its noteworthy sodium chloride (salt) content, the Dead Sea is remarkably rich in other minerals including potassium, magnesium, calcium and an array of other essential and trace minerals. At least 21 known minerals have been individuated so far. There are however many other constituents which are still unknown and remain to be discovered. Furthermore, the exact mineral and chemical composition of the Dead Sea salt varies with season, rainfall, depth of deposit, temperature and location at the Dead Sea.

Owing to their high mineral content and other hidden properties, Dead Sea salts have been related to a variety of medical benefits. And while applications of Dead Sea salts in cosmetics have already become common, in the field of dentistry they are relatively rare, especially in formulations designed for specific uses with controlled amounts of constituents.

That is particularly true for the Dead Sea salts and cannabinoids combination. Cannabinoids can be any type of cannabinoids, cannabinoid isolates from natural sources and also synthetic, semi-synthetic cannabinoids, as single components or combinations, including those comprised in extracts of various *Cannabis* plants. Compared to other fields where their benefits have been extensively investigated, there is still little research into specific applications of *Cannabis* and cannabinoids in dentistry.

Contribution of the cannabinoid component to the curative and cosmetic attributes of the formulations of the invention in terms of both, oral hygiene and healthy appearance of teeth and gums, has been proven in a series of experiments and case studies. Certain examples of antimicrobial effects of selected candidates from this group are provided in Example 2.

More specifically, FIGS. 1 and 2 illustrate antimicrobial effects of the cannabinoid component on dental plaque, with examples of specific cannabinoids and their antimicrobial effects in vitro in samples of plaque from various individuals. Example 2 demonstrates the effects of specific cannabinoids and cannabinoid combinations in vitro and in vivo, including differential effects on dental plaque and gingival plaque, as well as on various inflammatory processes in the gums (e.g., gingivitis and periodontitis) in various degrees of severity.

In general terms, the formulations of the invention give rise to two types of products: therapeutic and cosmetic products, including products for personal use and those applied by dental hygienist and dentists. The consistencies of the formulations and the concentrations of actives (the Dead sea salts and cannabinoids) can vary according to their specific uses and applicability to specific dental procedures.

Certain examples of formulations of the invention are provided in Example 1. Formulations of the invention can be characterized as:
  i. gel formulations for teeth whitening;
  ii. abrasive powder formulations for the removal of dental, and supra- and sub-gingival plaques, and polishing surfaces of the dental hard tissue;
  iii. gum-gel formulations for the improvement or enhancement of the healthy appearance of teeth and gums, and the epithelial attached gingiva;
  iv. liquid formulations for the irrigation of dental canals;
  v. formulations for the ongoing maintenance of oral and dental hygiene in a form of toothpaste, mouthwash and oral spray.

Another important advantage of the presently disclosed formulations is revealed in their compatibility with or adaptability to the existing dental care technologies to achieve a more enhanced improvement of oral and/or dental hygiene and overall healthy appearance. Of particular relevance are two types of dental technologies: dental blue light devices and ultrasonic tooth polishing devices, with the first being applied on a whole mouth or localized areas to obtain antimicrobial and whitening effects, and the second, with an aid of various accessories and adaptors, applied to remove dental and gingival plaque, and calculus or tartar (a hardened dental plaque, also chalk), and for polishing surfaces of the dental hard tissue.

For example, the formulations (i) and (iii) as above can be particularly advantageous when applied in conjunction with a blue light device with irradiation in the range of 390-500 nm to achieve a combination of antimicrobial as well as whitening effects. The effectiveness of this type of procedures is illustrated in Example 3, wherein the combination blue light and an exemplary cannabinoid (CBD) had significant and synergistic effect on the visual assessment of teeth and gums, and the bacterial count and viability in samples of dental and gingival plaques from tested individuals.

Another example is provided with formulations (ii), which were designed as to be compatible with ultrasonic tooth polishing devices. This common type of device (also ultrasonic dental cleaner) is being provided in various models, mainly including an ultrasonic main unit or scaler connected to high pressure air source and water, with a reservoir for abrasive powders, and in more recent models further including a reservoir for peroxide water. Formulations (ii) can be applied in devices with or without the peroxide water.

Inclusion of the cannabinoid component confers yet another advantage. The cannabinoids can provide as an especially diversified platform for personalized tailor-made solutions for dental care, as antimicrobial sensitivities thereto vary between individuals. This phenomenon is presently illustrated in FIG. 2 and Example 2 showing inter-individual differences in the effectiveness of certain cannabinoids and cannabinoid combinations on dental and gingival plaques in vitro and in vivo.

This can give rise to a series of methods and kits for a personalized dental care, wherein the effectiveness of specific cannabinoids and cannabinoid combinations is first tested in each individual, and then specific profiles are incorporated into the formulations (i) to (v) according to individual needs and specific procedures. An exemplary protocol of such personalized methods is illustrated in FIG. 3.

DESCRIPTION OF SPECIFIC EMBODIMENTS

Figure 1:
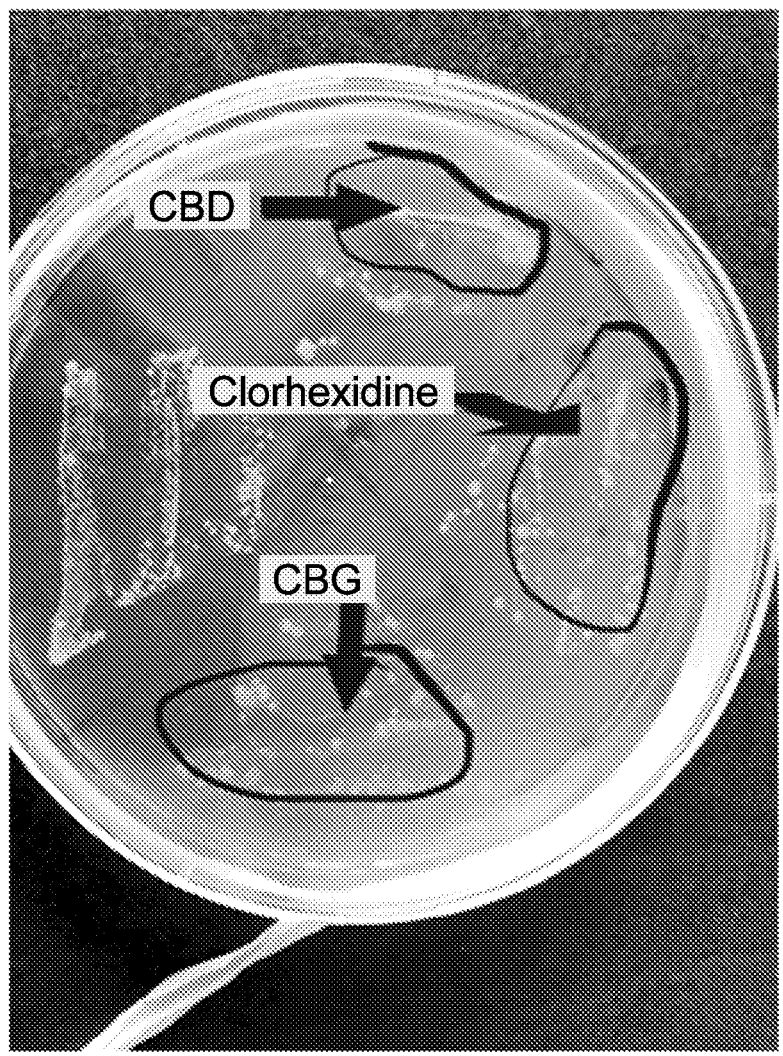
FIG. 1 illustrates a case study on the antimicrobial effect of cannabinoids on dental plaque. A sample of dental plaque was plated in the presence CBD or CBG and a reference antimicrobial agent (chlorhexidine gluconate, CHG), and cultured for 2 days at 37° C. The resulting bacterial colonies are shown.
Figure 2A:
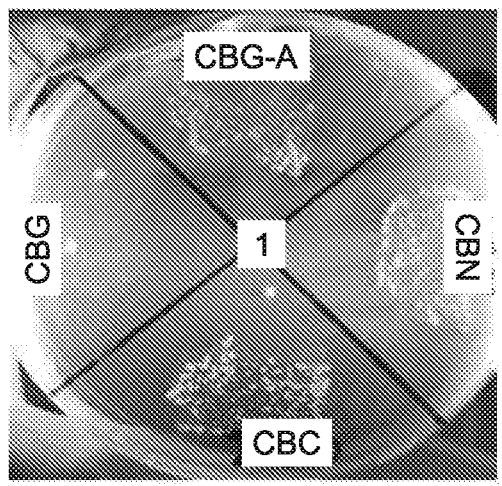
FIG. 2A-2F illustrate the effects of selected cannabinoids on gingival plaque in various individuals. Samples of gingival plaque were obtained from individuals A-F with various degrees of gum disease, samples were plated in the presence of various cannabinoids, cannabinoid formulations or essential oils, and cultured as above (samples A-F correspond to plates 1-6). The results are summarized in Table 8 in Example 2.2.
Figure 2B:
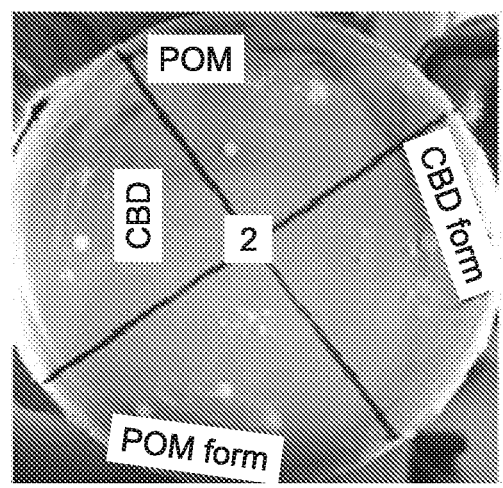
Figure 2C:
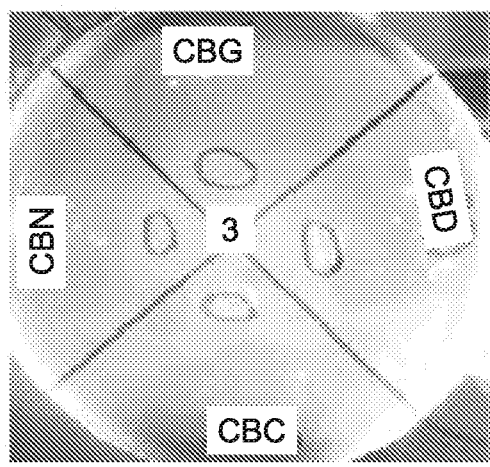
Figure 2D:
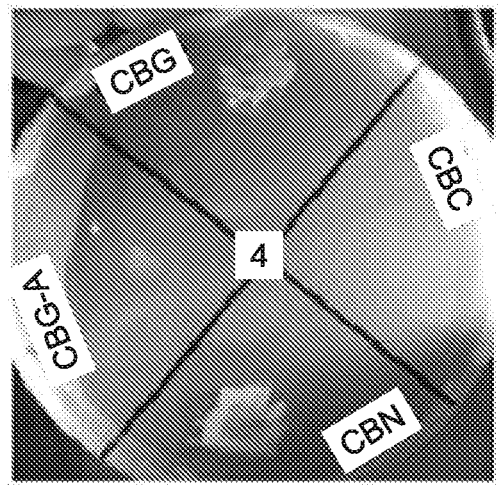
Figure 2E:
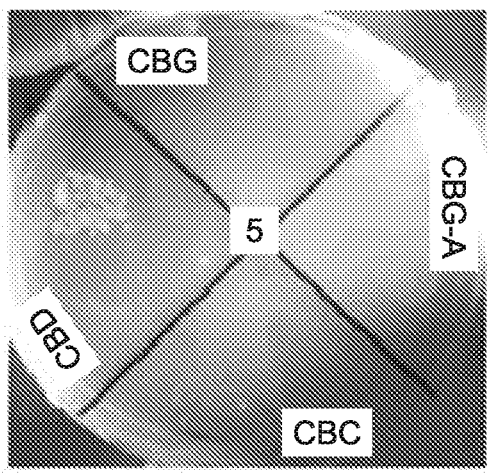
Figure 2F:
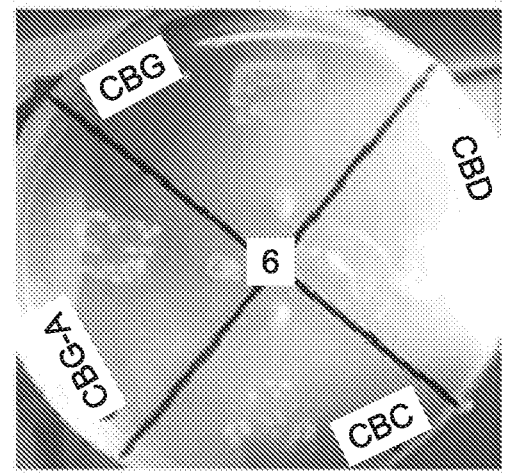

Specific embodiments of the invention will be now described in terms of materials, methods and conditions for enablement thereof by one of ordinary skill in the art. The embodiments and figures herein are considered as being illustrative, since the scope of the invention is to be limited by the appended claims.

In the broadest sense, the present invention provides a line of products, which alone or in combination with other dental technologies can facilitate improved management of oral hygiene and healthy appearance of teeth and gums. Specifically, the invention assists in the preservation of the healthy oral, dental, and/or gingival microflora, and minimization or a reduction of harmful flora (whether it is bacteria, viruses or fungi).

More specifically the invention provides two types of products: (1) for restorative or curative dental care and (2) for preventive or cosmetic dental care. Both types of products have a shared feature of being composed of a combination of actives, i.e., Dead Sea salts and cannabinoids, which are being provided in certain concentrations and proportions according to the specific type of product and its intended use.

Ultimately, both type of products of the invention help to prevent and reduce the overall burden of dental and gum diseases, and the risk of tooth loss.

Thus in its main aspects the invention can be articulated in the form of oral formulations and methods for using thereof for improving oral and/or dental hygiene, and/or for enhancing the healthy appearance of teeth and gums, wherein the formulations comprise Dead Sea salt and at least one synthetic, semi-synthetic or natural cannabinoid, a precursor, a derivative, or any combination thereof, or an extract of a *Cannabis* plant.

The terms 'oral and dental hygiene' and 'healthy appearance of teeth and gins' have been discussed above. As has been noted, the terms oral or dental hygiene encompass herein preventive and curative approaches. These terms further encompass various manifestations of poor oral or dental hygiene, such as dental caries, gingivitis, periodontitis and other dental disorders, as well as halitosis (prevent bad breath). They also encompass any part of the oral cavity, such as the lips, gingivae, retromolar trigone, teeth, hard palate, cheek mucosa, mobile tongue and floor of the mouth.

Healthy appearance of teeth and gums is closely related to the oral or dental hygiene in the sense that healthy teeth have fewer cavities, and have minimal or no plaque deposits. Healthy teeth appear cleaner, and healthy gums are pink and firm.

These terms further relate to both, personal and professional care.

As has been noted, the oral and dental hygiene and the healthy appearance of teeth and gums are very much dependent on the constitution of oral and dental microflora, and the right balance between the populations of harmful and beneficial microflora. This balance is highly individual, even among healthy subjects, and can change in the course of life of the same individual.

The term 'microflora' (also referred to herein as flora and oral, dental and gingival flora) relates any type of bacteria, fungi and viruses colonizing the mouth.

In terms of harmful microflora, this term may relate, although not limited to, Gram positive and Gram negative bacteria, aerobic and anaerobic bacteria and facultative anaerobic bacteria. Specific examples are *Streptococcus mutans, Treponema denticola* and *Porphyromonas gingivalis*, which are implicated in dental decay and periodontal infections.

A harmful microflora may further relate to oral fungal infections, such as Oropharyngeal Candidiasis (oral thrush) as well as Non-Candidal oral infections.

This term may further relate to oral viral infections such as infections by the human herpesvirus (HHV) or human papillomavirus (HPV), for example.

The terms 'improving' and 'enhancing' with respect to oral or dental hygiene and healthy appearance of teeth and gums are highly individual, and in this context should be perceived as such. Rather than being numeric or measurable, these terms herein are notional and subjective, and depend on the impression and judgment of an individual or a dentist.

Still, in numerous embodiments said improving oral and/or dental hygiene, and/or said enhancing the healthy appearance of teeth and gums further comprises a reduction in the population of harmful microflora in the oral cavity, teeth or gums, said microflora being bacteria, fungi, viruses or a combination thereof.

In certain embodiments, especially under profession care, said improving oral and/or dental hygiene can further comprise a removal of dental and/or gingival plaque, and/or dental canal therapy.

In yet other embodiments said improving oral hygiene and enhancing the healthy appearance of teeth and gums can further comprise teeth whitening.

A special attention will be given to the two main actives characterizing the presently disclosed formulations, the Dead Sea salt and cannabinoids. The term 'Dead Sea salt' refers herein to salt or mineral deposit extracted or obtained from the Dead Sea, as dry deposits and/or salts obtained from water and mud of the Dead Sea.

Dead Sea salt is characterized in that it has high and unique mineral content. For example, most oceanic salt is approximately 85% sodium chloride, while Dead Sea salt is only 30.5% of this, with the remainder composed of other dried minerals and salts.

The Dead Sea is principally a magnesium chloride lake.

Specifically, the Dead Sea water has pH value of about 6 compared to other oceans and seas (pH of about 8). It is more abundant in many elements, including chloride, magnesium, sodium, calcium, potassium and bromide, and it has a lower concentration of sulfate and bicarbonate.

The Dead Sea mud is characterized in high concentrations of $CaO$, $CO_2$ and $SiO_2$.

Further, the Dead Sea minerals consist of specific elements related to regulatory activities. The most substantial elements present are magnesium, potassium, and calcium, which are known the co-factors and regulators in numerous cellular and membranal processes. Therefore, the Dead Sea minerals are often referred to by the term nutrients.

The Dead Sea further contains a substantial amount of as anti-oxidants.

It should be noted that the Dead Sea's mineral composition varies with season, rainfall, depth of deposit, and ambient temperature.

Certain estimates of the composition of the Dead Sea water and mud are provided in Tables 1A-1C below with references to the respective sources.

TABLES 1A-1C

| Composition of ions and minerals in the Dead Sea water and mud |  |
| --- | --- |
| A. | |
| Dead Sea water | Concentration (g/L) |
| Total content of mineral salts | 348 |
| Chloride | 212.4 |

TABLES 1A-1C-continued

| Composition of ions and minerals in the Dead Sea water and mud | |
|---|---|
| Magnesium | 40.65 |
| Sodium | 39.15 |
| Calcium | 16.86 |
| Potassium | 7.26 |
| Bromide | 5.12 |
| Sulfate | 0.47 |
| Bicarbonate | 0.22 |
| Dead Sea mud | Content percentage (w/w) |
| CaO | 20.6-27.9 |
| $CO_2$ | 15.5-25.0 |
| $SiO_2$ | 23.7-33.7 |
| Total Soluble Salts (TSS) | 10.2 |
| Chlorides | 4.5 |
| Sulfates | 0.06 |

Bawab AA et al IOP Conf. Series: Materials Science and Engineering 2018 305, 012003.
Doi: 10.1099/1757-899X/305/1/012003

B.

| Dead Sea water (ions) | Concentration (mg/L) |
|---|---|
| Chloride and Bromide | 230,400 |
| Magnesium | 45,900 |
| Sodium | 36,600 |
| Calcium | 17,600 |
| Potassium | 7,800 |
| Dead Sea mud (minerals) | Content percentage (w/w) |
| Silicon dioxide | 20 |
| Calcium oxide | 15.5 |
| Aluminum oxide | 4.8 |
| Magnesium oxide | 4.5 |
| Iron(III) oxide | 2.8 |
| Sodium oxide | 1.7 |
| Potassium oxide | 1.3 |
| Titanium(IV) oxide | 0.5 |
| Sulfur trioxide | 0.4 |
| Phosphorus pentoxide | 0.3 |
| Chloride | 6.7 |
| Bromide | 0.2 |

Ma'or Z et al 'Antimicrobial properties of Dead Sea black mineral mud'
Int J Dermatol 2005 Vol 45, Issue 5. https://doi.org/10.1111/j.1365-4632.2005.02621.x

C.

| Dead Sea water | Content percentage (w/w) |
|---|---|
| Magnesium Chloride ($MgCl_2$) | 31.0-35.0 |
| Potassium Chloride (KCl) | 24.0-26.0 |
| Sodium Chloride (NaCl) | 4.0-8.0 |
| Calcium Chloride ($CaCl_2$) | 0.4-0.6 |
| Magnesium Bromide ($MgBr_2$) | 0.3-0.6 |
| Sulfates | 0.05-0.2 |
| Insolubles | 0.05-0.3 |

US 2006/0083708 by Schwartz S.

Thus the term Dead Sea salt encompasses herein all of the above, in terms of sources, ranges of concentrations and proportions, and the mentioned references are incorporated herein by reference.

It further encompasses Dead Sea extracts and salts obtained by evaporation of water.

This term further implies commercially available products referred to by that name.

The term 'cannabinoid' is used herein in its broadest sense. It implies the entire class of chemical compounds, cannabinoid/cannabinoid agonists/cannabinoid-related compounds, capable of acting with various affinities on the endogenous cannabinoid receptors (CB1/CB2). This group of ligands include the endocannabinoids (produced naturally by humans and animals), phytocannabinoids (found in cannabis and some other plants), and synthetic cannabinoids (manufactured artificially).

In other words, the term cannabinoid implies herein any type of synthetic, semi-synthetic or natural cannabinoid.

The natural or classical cannabinoids are cannabinoids that originate from various cannabis plants. This group includes, until now, more than 100 different cannabinoids. The natural cannabinoids are classified as shown in Table 2 below.

TABLE 2

Main classes of natural cannabinoids

| Type | Skeleton |
| --- | --- |
| Cannabigerol-type CBG | |
| Cannabichromene-type CBC | |
| Cannabidiol-type CBD | |
| Tetrahydrocannabinol- and Cannabinol-type THC, CBN | |
| Cannabielsoin-type CBE | |
| iso-Tetrahydrocannabinol-type iso-THC | |
| Cannabicyclol-type CBL | |

TABLE 2-continued

Main classes of natural cannabinoids

| Type | Skeleton |
|---|---|
| Cannabicitran-type CBT | |

Any of the above classes or types are relevant to the presently disclosed formulations. Thus in numerous embodiments the formulations of the invention can comprise as an active ingredient at least one of a Tetrahydrocannabinol- and Cannabinol-type (THC, CBN), a Cannabidiol-type (CBD), a Cannabigerol-type (CBG), a Cannabichromene-type (CBC), a Cannabielsoin-type (CBE), a iso-Tetrahydrocannabinol-type (iso-THC), a Cannabicyclol-type (CBL), a Cannabicitran-type (CBT), a derivative, a precursor, or a combination thereof.

All classes derive from cannabigerol-type compounds and differ mainly in the way this precursor is cyclized. The classical cannabinoids are derived from their respective 2-carboxylic acids (denoted with -A).

Of further relevance to the invention are cannabinoid precursors, derivatives, and combination thereof. Well known examples of precursors are THC-A and CBD-A.

In certain embodiments the formulations can comprise classical cannabinoids, i.e., THC (Tetrahydrocannabinol, including the two isoforms 49-THC, 48-THC and the acid form THC-A), CBD (Cannabidiol and the acid form CBD-A), CBN (Cannabinol), CBG (Cannabigerol), CBC (Cannabichromene), CBL (Cannabicyclol), CBV (Cannabivarin), THCV (Tetrahydrocannabivarin), CBDV (Cannabidivarin), CBCV (Cannabichromevarin), CBGV (Cannabigerovarin) and CBGM (Cannabigerol Monomethyl Ether).

An exemplary non-limiting list of candidate cannabinoids is provided below, including natural and non-natural cannabinoids, representative of cannabinoid families, cannabinoid precursors and derivatives: Tetrahydrocannabinol (THC or 49-THC), Cannabidiol (CBD), Cannabichromene (CBC), Cannabichromenic acid (CBCA), Cannabichromevarin (CBCV), Cannabichromevarinic acid (CBCVA), Cannabidiol (CBD), Cannabidiol monomethylether (CBDM), Cannabidiolic acid (CBDA), Cannabidiorcol (CBD-C1), Cannabidivarin (CBDV), Cannabidivarinic acid (CBDVA), Cannabielsoins, Cannabielsoic acid B (CBEA-B), Cannabielsoin (CBE), Cannabielsoin acid A (CBEA-A), Cannabigerols, Cannabigerol (CBG), Cannabigerol monomethylether (CBGM), Cannabigerolic acid (CBGA), Cannabigerolic acid monomethylether (CBGAM), Cannabigerovarin (CBGV), Cannabigerovarinic acid (CBGVA), Cannabinol (CBN), Cannabinodiol (CBND), Cannabinodivarin (CBVD), Cannabinol methylether (CBNM), Cannabinol-C2 (CBN-C2), Cannabinol-C4 (CBN-C4), Cannabinolic acid (CBNA). Levonantradol, Ajulemic acid (CT3), ECP002A, Nabiximols, Nabilone.

For the purpose of specific embodiments, promising cannabinoid candidates to be included in the formulations of the invention are: CBD, CBG, CBC and CBN, alone or in combination, and also derivatives, precursors (CBGA) or combination thereof.

The terms cannabinoids herein also means an extract of any variety of cannabis, specifically the strains C. sativa, C. indica and C. ruderalis, and combination thereof. It should be noted in this connection that cannabis based extracts can further comprise various combinations of terpenes, sesquiterpenes, carotenes, flavonoids, which in turn can contribute to the beneficial properties of the formulations of the invention, in terms of actives absorption, activity, and also add flavor-, odor-, and color-imparting qualities.

Methods for obtaining extracts of cannabis plants with high and intermediate degrees of purities are well known in the art. Such extracts are further commercially available.

As previously noted, the formulations of the invention serve as a basis for two types of products: therapeutic and cosmetic products, which differ by their composition of actives and intended use.

In numerous embodiments, the formulations for cosmetic or aesthetic purposes can comprise Dead Sea salt at a concentration in the range of about 0.1% to about 1% (w/w).

In yet other embodiments, they can comprise one or more cannabinoids at a concentration in the range of about 1% to about 10% (w/w).

In further embodiments, they can comprise Dead Sea salt at a concentration in the range of about 0.1% to about 1% (w/w) and one or more cannabinoids at a concentration in the range of about 1% to about 10% (w/w).

More precisely, in certain embodiments the cosmetic formulations of the invention can comprise Dead Sea salt as defined above at a concentration in ranges of about 0.1%-0.2%, 0.2%-4.3%, 0.3%-0.4%, 0.4%-0.5%, 0.5%-0.6%, 0.6%-0.7%, 0.7%-0.8%, 0.9%-1%, (w/w), and also more than 1% as 1.1%-1.2%, 1.2%-1.3%, 1.3%-1.4%, 1.4%-1.5%, 1.5%-1.6%, 1.6%-1.7%, 1.7%-1.8%, 1.9%-2% (w/w) or more.

In other embodiments, the formulations can comprise one or more cannabinoids as defined above at a concentration in ranges of about 0.5%-1%, 1%-1.5%, 1.5%-2%, 2%-2.5%, 2.5%-3%, 3%-3.5%, 3.5%-4%, 4%-4.5%, 4.5%-5%, 5%-5.5,%, 5.5%-6%, 6%-6.5%, 6.5%-7%, 7%-7.5%, 7.5%-8%, 8%-8.5%, 8.5%-9%, 9%-9.5%, 9.5%-10% (w/w), and more than 10% as up to 11%, 12%, 13%, 14%, 15%, 16%, 17%, 18%, 19% and 20% (w/w) or more.

In further embodiments, this type of formulations can comprise both actives, the Dead Sea salts at a concentration in ranges of about 0.1%-0.2%, 0.2%-0.3%, 0.3%-0.4%, 0.4%-0.5%, 0.5%-0.6%, 0.6%-0.7%, 0.7%-0.8%, 0.9%-1%, (w/w), and also more than 1% as 1.1%-1.2%, 1.2%-1.3%, 1.3%-1.4%, 1.4%-1.5%, 1.5%-1.6%, 1.6%-1.7%, 1.7%-1.8%, 1.9%-2% (w/w) or more; and one or more cannabinoids at a concentration in ranges of about 0.5%-1%, 1%-1.5%, 1.5%-2%, 2%-2.5%, 2.5%-3%, 3%-3.5%, 3.5%-4%, 4%-4.5%, 4.5%-5%, 5%-5.5,%, 5.5%-6%, 6%-6.5%, 6.5%-7%, 7%-7.5%, 7.5%-8%, 8%-8.5%, 8.5%-9%, 9%-9.5%, 9.5%-10% (w/w), and more than 10% as up to 11%, 12%, 13%, 14%, 15%, 16%, 17%, 18%, 19% and 20% (w/w) or more (see Example 1.1).

Another type of cosmetic formulations has been developed with the two actives being present at a significantly lower concentrations.

In certain embodiments this type of formulations can comprise Dead Sea salt at a concentration in the range of about 0.01% to about 1% (w/w).

In other embodiments, the formulations can comprise one or more cannabinoids at a concertation in the range of about 0.001% to about 1% (w/w).

In further embodiments, the formulations can comprise Dead Sea salt at a concentration in the range of about 0.01% to about 1% (w/w) and one or more cannabinoids at a concertation in the range of about 0.001% to about 1% (w/w).

More precisely, in certain embodiments this type of formulations can comprise Dead Sea salt at a concentration up to about 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1%, (w/w), and also more than 1% up to about 1.1%, 1.2%, 1.3%, 1.4%, 1.5%, 1.6%, 1.7%, 1.8%, 1.9%, 2% (w %/w %).

In other embodiments, the formulations can comprise one or more cannabinoids as defined above at a concentration up to about 0.001%, 0.002%, 0.003%, 0.004%, 005%, 0.006%, 0.007%, 0.008%, 0.009%, 0.01%, and further in the ranges of about 0.01%-0.0-2%, 0.02%-0.03%, 0.03%-0.04%, 0.04%-0.05%, 0.05%-0.06%, 0.06%-0.07%, 0.07%-008%, 0.08%-0.09%, 0.09%-0.1%, and further in the ranges of about 0.1%-0.2%, 02%-0.3%, 0.3%-0.4%, 0.4%-0.5%, 0.5%-0.6%, 0.6%-0.7%, 0.7%-0.8%, 0.8%-0.9%, 0.9%-1% (w/w).

In further embodiments, this type of formulations can comprise both actives, Dead Sea salt at a concentration up to about 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1%, (w/w), and also more than 1% up to about 1.1%, 1.2%, 1.3%, 1.4%, 1.5%, 1.6%, 1.7%, 1.8%, 1.9%, 2% (w/w); and one or more cannabinoids at a concentration up to about 0.001%, 0.002%, 0.003%, 0.004%, 0.005%, 0.006%, 0.007%, 0.008%, 0.009%, 0.01%, and further in the ranges of about 0.01%-0.02%, 0.02%-0.03%, 0.03%-0.04%, 0.04%-0.05%, 0.05%-0.06%, 0.06%-0.07%, 0.07%-0.08%, 0.08%-0.09%, 0.09%-0.1%, and further in the ranges of about 0.1%-0.2%, 0.2%-0.3%, 0.3%-0.4%, 0.4%-0.5%, 0.5%-0.6%, 0.6%-0.7%, 0.7%-0.8%, 0.8%-0.9%, 0.9%-1% (w/w) (see Example 1.2).

The therapeutic formulations of the invention are characterized in that they can comprise the two actives at much higher concentrations.

In numerous embodiments, the therapeutic formulations of the invention can comprise Dead Sea salt at a concentration in the range of about 0.1% to about 10% (w/w).

In other embodiments, the formulations can comprise one or more cannabinoids at a concentration in the range of about 1% to about 30% (w/w.

In further embodiments, the formulations can comprise Dead Sea salt at a concentration in the range of about 0.1% to about 10% (w/w) and one or more cannabinoids at a concentration in the range of about 1% to about 30% (w/w).

And more precisely, in certain embodiments this type of formulations can comprise: Dead Sea salt as defined above at a concentration in the ranges of about 0.5%-1%, 1%-1.5%, 1.5%-2%, 2%-2.5%, 2.5%-3%, 3%-3.5%, 3.5%-4%, 4%-4.5%, 4.5%-5%, 5%-5.5%, 5.5%-6%, 6%-6.5%, 6.5%-7%, 7%-7.5%, 7.5%-8%, 8%-8.5%, 8.5%-9%, 9%-9.5%, 9.5%-10% (w/w), and more than 10% as up to about 11%, 12%, 13%, 14%, 15%, 16%, 17%, 18%, 19%, 20% (w/w).

In other embodiments, the formulations can comprise one or more cannabinoids as defined above at a concentration in the ranges of about 0.5%-1%, 1%-1.5%, 1.5%-2%, 2%-2.5%, 2.5%-3%, 3%-3.5%, 3.5%-4%, 4%-4.5%, 4.5%-5%, 5%-5.5%, 5.5%-6%, 6%-6.5%, 6.5%-7%, 7%-7.5%, 7.5%-8%, 8%-8.5%, 8.5%-9%, 9%-9.5%, 9.5%-10% (w/w), and further in the ranges of about 1%-5%, 5%-10%, 10%-15%, 15%-20%, 20%-25%, 25%-30% (w/w), or more as up to about 31%, 32%, 33%, 34%, 35%, 365, 37%, 38%, 39%, 40%, 50% (w/w).

In further embodiments, this type of formulations can comprise both actives, Dead Sea salt at a concentration in the ranges of about 0.5%-1%, 1%-1.5%, 1.5%-2%, 2%-2.5%, 2.5%-3%, 3%-3.5%, 3.5%-4%, 4%-4.5%, 4.5%-5%, 5%-5.5%, 5.5%-6%, 6%-6.5%, 6.5%-7%, 7%-7.5%, 7.5%-8%, 8%-8.5%, 8.5%-9%, 9%-9.5%, 9.5%-10% (w/w), and more than 10% as up to about 11%, 12%, 13%, 14%, 15%, 16%, 17%, 18%, 19%, 20% (w/w); and one or more cannabinoids at a concentration in the ranges of about 0.5%-1%, %-1.5%, 1.5%-2%, 2%-2.5%, 2.5%-3%, 3%-3.5%, 3.5%-4%, 4%-4.5%, 4.5%-5%, 5%-5.5%, 5.5%-6%, 6%-6.5%, 6.5%-7%, 7%-7.5%, 7.5%-8%, 8%-8.5%, 8.5%-9%, 9%-9.5%, 9.5%-10% (w/w), and further in the ranges of about 1%-5%, 5%-10%, 10%-15%, 15%-20%, 20%-25%, 25%-30% (w/w), or more as up to about 31%, 32%, 33%, 34%, 35%, 365, 37%, 38%, 39%, 40%, 50% (w/w).

The cosmetic formulations can be further characterized in that apart from the actives they can further comprise additional components responsible for the texture, flavor, abrasiveness and other qualities, which can vary as per intended use (e.g., toothpaste, mouthwash, oral spray, chewing gum).

In numerous embodiments the cosmetic formulations can further comprise at least one agent from at least one of the following groups: a humectant, a thickening agent, an alcohol, a whitening agent, a pigment, a flavoring agent, a preservative. (Example 1.1).

Yet in other numerous the cosmetic formulations can further at least one agent from at least one of the following groups: a humectant, a surfactant, a thickening agent, an abrasive agent, a preservative, a mineral or a salt, an antioxidant, a nutrient, a whitening agent, a flavoring agent, a pigment (Example 1.2).

Before going into further details, a number of terms should be clarified. The term 'humectant' is used herein in the broadest sense as a material with hygroscopic properties, or a material which binds and holds the solvent in the respective formulation. Dead Sea salt, for example, is a known humectant. In dentistry, the most ubiquitous solvent is water and typical humectants are glycerin (glycerol), sorbitol, pentatol, and also more complex molecules as cellulose derivatives and polyethylene glycols (PEG), and further hexylene and butylene glycols and a hydroxy acids such as lactic acid.

The term 'surfactant' is also used in a broad way to denote a surface active agent or a substance which creates self-assembled molecular clusters (micelles) in a solution, or an emulsifier. This term herein encompasses anionic, cationic, non-ionic and amphoteric surfactants. In dentistry, it often includes carboxylic acid surfactants, and a number of others.

The term 'thickening agent' herein refers to any substance which can increase the viscosity of a formulation. It is referred to by terms such as gelling agent or binder, and further stabilizing agents which work with emulsifiers. Specific examples in dentistry can include polyvinyl carboxy polymers (Carbomer, Carbopol) and polyvinylpyrrolidone (PVP) polymers (various types of carbomer) and a cellulose derivatives.

In many applications herein, the substances included under the terms humectant, surfactant and thickening agent can be overlapping, e.g., as cellulose derivatives.

A 'alcohol' in this context is often methanol, ethanol or propanol. This term can also apply to certain humectants such as sorbitol (a polyol), for example.

A 'whitening agent' in dentistry is often peroxide, which in itself is a group of substances e.g., carbamide peroxide or hydrogen peroxides. Thus herein it encompasses any peroxide derivative.

A 'pigment' in dentistry is often intensely white or with bluish tincture. One of the common examples is titanium dioxide.

A 'flavoring agent' in dentistry is often peppermint, spearmint or a fruit flavor together with or without natural or artificial sweeteners.

In more detail, in certain embodiments the cosmetic formulations of the invention can comprise humectants such as cellulose derivatives or PEGs, thickening agents such as PVPs, and further alcohols such as ethanol, and whitening agent such as hydrogen peroxide, and further pigments such as titanium dioxide.

In further embodiments these formulations can comprise specific humectants methycellulose, hydroxypropyl methycellulose or methyl hydroxypropyl cellulose (HPMC), and PEG 300.

Cosmetic formulations designed for specific applications, such as teeth whitening, can further comprise a combination of HPMC, peroxide, ethanol and a PVP. Other examples of such formulations can comprise a combination of PEG 300 and titanium dioxide. Both types have been presently exemplified (Table 3, Example 1). This type of formulations can be particularly effective when administered in conjunction with the blue light technology.

The cosmetic formulations of the invention can be further articulated in terms of additives as formulations further comprising at least one component of the following groups:

a humectant as at least one of glycerol (glycerin), propylene glycol, butylene glycol, sorbitol and/or a polyethylene glycol (PEG) or a derivative thereof such as PEG-40 hydrogenated castor oil, a surfactant as at least one of a carboxylic acid surfactant, lauryl glucoside, sodium lauryl sarcosinate (INCI), a thickening agent as at least one of a carbomer, a cellulose derivative, a preservative as at least one of a phosphate derivative, a sorbate salt, a glyceryl ether, a benzoate salt or acid, an antioxidant as at least one of glutathione (GSH), N-acetyl-cysteine (NAC), a mineral or salt as at least one of zinc sulphate monohydrate, a bicarbonate salt a whitening agent as at least one of a bicarbonate salt, carbamide, an abrasive agent as at least one of silica or a derivative thereof a nutrient as at least one of an amino acid or a derivative thereof, curcumin, piperine, resveratrol, an essential oil, a herbal extract, and a flavoring agent as at least one of peppermint, spearmint, menthol, a fruit flavor, a natural or an artificial sweetener;

wherein certain agents can be included in more than one group.

The term 'preservative' is used herein as in the context of food products s to prevent spoilage. In dentistry it often includes substances from the groups of phosphate derivative, sorbate or benzoate salt or acid, and others.

The terms 'antioxidant' and 'nutrient' were previously mentioned in connection with Dead Sea salt. They are now denote additional antioxidants and nutrients, which can be glutathione (GSH) or glutathione and N-acetyl-cysteine (NAC), minerals, amino acids vitamins and other supplements, also in the form of essential oils and one or more herbal extracts or mixes of extracts.

The term 'essential oil' is used herein in the broadest sense to encompass oil compositions obtained by distilling or extracting different parts of plants, including the flowers, leaves, bark, roots, resin and peels. Essential oils further refers to volatile oils, aromatic oils, ethereal oils, because of the high concentration of the aromatic compounds.

As was noted above, some of these groups are overlapping, and therefore it should be understood that any given substance can be belong to more than one group.

Thus in specific embodiments, the cosmetic formulations of the invention can comprise humectants such as glycerol, propylene glycol, butylene glycol, sorbitol, surfactants such as carboxylic acid surfactants, thickening agents such as cellulose derivatives, preservatives such as phosphate derivatives, sorbate or benzoate salt or acid, antioxidants such as GSH or NAC, nutrients in a form of an essential oil, and flavoring agent such as peppermint, spearmint or fruit flavor and/or an artificial sweetener.

Yet in other specific embodiments, the cosmetic formulations can comprise glycerol, citric acid monohydrate, HPMC, disodium phosphate, potassium sorbate, glutathione, sodium saccharinate, a peppermint flavoring agent and at least one essential oil. This type of formulation has been has been exemplified (Table 5, Example 1).

The term 'abrasive' encompasses herein a wide group of agents, and also whitening agents, such sodium bicarbonate, calcium carbonate or dicalcium phosphate, and also silica-based compounds. Some of these agents, although in relatively lower quantities, are present in cosmetic products, such as toothpaste, for example.

Formulations comprising abrasive agents are further relevant to therapeutic applications. One example of abrasive therapeutic formulations, or polish formulations, was especially designed for application with any type of ultrasonic tooth polishing device, with or without peroxide water.

In numerous embodiments the abrasive formulations of the invention can comprise higher concentrations of actives, the Dead Sea salt and cannabinoids as defined above, and can further comprise at least one agent from at least one of the following groups: an abrasive and/or whitening agent, an antioxidant and a nutrient.

In numerous embodiments the abrasive formulations of the invention can comprise a combination of abrasives and/or whitening agents such as sodium bicarbonate, calcium carbonate or dicalcium phosphate, antioxidants such as GSH or NAC, and nutrient such as curcumin, piperine, resveratrol, for example.

In specific embodiments, the abrasive formulations can comprise sodium bicarbonate, calcium carbonate, GSH and turmeric (Table 4, Example 1).

Another example of therapeutic formulations of the invention, especially in liquid forms, is formulations for irrigation of dental canal (Table 6, Example 1).

In numerous embodiments, this type and also other therapeutic formulations of the invention can further comprise, in addition to the two actives, one or more additional antiseptic or antimicrobial agents. Non-limiting examples of relevant agents in this field are: chlorhexidine compounds, chlorhexidine digluconate (CHG), cationic antimicrobial compounds, essential oils, fluoride compounds, chlamoxicillin, amoxicillin/clavulanate, clindamycin, metronidazole or combination thereof.

It should be noted that the term antimicrobial agent is essentially a functional term, and thus can encompass a broad range of compounds from natural and non-natural sources. It can further include herbal extract (e.g., a pomegranate extract) that are known for their antimicrobial properties. Another example is extracts of marine organisms such as algae, cnidarians, phytoplankton, mollusks, sponges and reefs, which have been also related to antibacterial effects.

Thus in certain embodiments the antiseptic or antimicrobial agent that can be included in the abrasive and other therapeutic formulations of the invention is C-G.

In certain embodiments the formulations for irrigation of dental canal can comprise or consist essentially of the two main actives, the Dead Sea salt and cannabinoids, in therapeutic or higher concentrations as defined above and of CHG in physiological water, wherein the cannabinoids are first solubilized in CIG or a water-miscible alcohol such as ethanol or methanol.

Applicability of the whitening and abrasive formulations in conjunction with specific devices has been mentioned above, and will be discussed in more detail in the context of methods of the invention.

Thus it is another important aspect of the invention to provide methods for improving oral and/or dental hygiene, and/or enhancing the healthy appearance of teeth and gums, the key feature of the methods being that they involve oral administering to a subject one or more of the previously described therapeutic or cosmetic formulations.

In numerous embodiments the methods of the invention can further facilitate a reduction in the population of harmful microflora in the oral cavity, teeth or gums.

In numerous embodiments said methods also facilitate an enhancement of the healthy appearance of teeth and gums further comprises teeth whitening.

Still in numerous embodiments methods facilitate an improvement of oral and/or dental hygiene further comprises a removal of dental and/or gingival plaque, and/or dental canal therapy.

Special emphasis should be given to the methods of the invention where the formulations are provided in conjunction with specific dental devices. Specific examples are methods using the above described cosmetic formulations for teeth whitening in conjunction with the blue light irradiation (see Example 3).

In numerous embodiments such methods comprise administering to a subject the cosmetic formulations for teeth whitening, and further administering to the subject an irradiation at a wave length in range of about 390-500 nm.

More specifically, the blue light irradiation can be at a wave length in range of about 300-320 nm, 320-340 nm, 340-360 nm, 360-380 nm, 380-400 nm, 400-420 nm, 420-440 nm, 440-460 nm, 460-480 nm, 480-50 nm, 500-520 nm, 520-540 nm, 540-560 nm, 560-580 nm, 580-600 nm, and can being administered on the whole mouth or a localized area.

In numerous embodiments the formulations and the blue light irradiation are being administered simultaneously.

Another example is methods using the abrasive formulations of the invention in conjunction with an ultrasonic tooth polishing devices, with or without peroxide water.

In yet another aspect, the invention provides personalized methods and kits for improving oral and/or dental hygiene, and/or enhancing the healthy appearance of teeth and gums. An essential difference between this type of methods and those described above is that in the personalized methods the subject is provided a specific formulation with a predetermined composition of cannabinoids or cannabinoids combinations, which were previously tested in vitro and were found to be effective against at least one constituent of an oral and/or dental microflora in an oral, dental and/or gingival sample from the same subject.

Essentially, the personalized methods of the invention involve administering to a subject an oral formulation of any one of the above aspects and/or embodiments, wherein said formulation comprises a type of cannabinoid or a combination of cannabinoids previously determined in vitro as effective against at least one constituent of an oral and/or dental microflora in an oral, dental and/or gingival sample of the same subject.

In numerous embodiments, the personalized methods can be articulated in terms of the following steps:

(a) obtaining an oral, dental and/or gingival sample form a subject;

(b) performing an in vitro test of the sample against a panel of candidate cannabinoids or combinations thereof, as in Examples 2 and 4; and (c) administering to the subject a formulation comprising the cannabinoid or the combination that was found to be effective against at least one constituent of an oral and/or dental microflora in step (b).

Finally, from yet another point of view, the invention provides use of the above described oral formulations in the manufacture of medical or non-medical products for improving oral and/or dental hygiene, which can have dramatic effects in reducing the viability and expansion of the harmful dental flora, reducing the severity of gingivitis, improving the overall healthy appearance of teeth and gums.

EXAMPLES

The following examples are put forth so as to provide those of ordinary skill in the art with a complete disclosure and description of how to make and use the methods and compositions of the invention, and are not intended to limit the scope of what the inventors regard as their invention.

Example 1

1.1 Therapeutic and Cosmetic Formulations of the Invention

Certain examples of formulations (i) to (iv) are provided in Tables 3-6 below, listing the main components, consistencies and ranges of concentrations of the two main actives, the Dead Sea salts and cannabinoids, as per intended uses.

TABLE 3

Examples of the gel formulations for teeth whitening

| Main constituents | Formulation 1 | Formulation 1' |
|---|---|---|
| Water | Purified RO water | Purified RO water |
| Humectant | Benecel E4M PH | Lipoxol 300 MED |
| Thickening agents | Flexithix | |
| Alcohol | NEDALCO 65100 FOOD Alcohol | |
| Whitening agent | Peroxydone K-30 | |
| Pigment | | Titanium oxide |
| Actives | Dead Sea salt at 0.1%-1% (w/w) | Dead Sea salt at 0.1%-1% (w/w) |
| | Cannabinoids at 1-10% (w/w) | Cannabinoids at 1-10% (w/w) |

TABLE 4

An example of abrasive powder formulations

| Main constituents | Formulation 2 |
|---|---|
| Abrasive and whitening agents | Soda bicarbonate |
| | Calcium carbonate |
| Antioxidant | Glutathione |
| Nutrient | Turmeric |
| Actives | Dead Sea salt at 0.1%-10% (w/w) |
| | Cannabinoids at 1-30% (w/w) |

TABLE 5

An example gum-gel formulations for cosmetic purposes

| Main constituents | Formulation 3 |
|---|---|
| Water | Purified RO water |
| Preservatives | Potassium sorbate |
| | Disodium phosphate |
| Surfactants | Citric acid monohydrate |
| Humectant | Glycerol |
| Favoring agent | Peppermint leaf |
| | Sodium saccharinate |
| Thickening agents | Hypromellose |
| Antioxidant | Glutatione |
| Nutrients | Essential oils |
| Actives | Dead Sea salt at 0.1%-1% (w/w) |
| | Cannabinoids at 1-10% (w/w) |

TABLE 6

An example of liquid formulations for the irrigation of dental canal

| Main constituents | Formulation 4 |
|---|---|
| Water | Physiological water |
| Antiseptic or antimicrobial agent | Chlorhexidine gluconate (CHG) |
| Actives | Dead Sea salt at 0.1%-10% (w/w) |
| | Cannabinoids at 1-30% (w/w) * |

* Cannabinoids are first solubilized in an water-miscible alcohol (ethanol) or CHG.

1.2 Second Generation Formulations of the Invention

More recently, a second line of formulations have been developed specifically for cosmetic purposes. A distinctive feature of these formulations is the relatively low concentrations of actives, the Dead Sea salts and cannabinoids, e.g., as low as 0.2% and 0.01% (w/w), respectively. The formulations can further include one or more agents belonging to groups such as: humectant, surfactant, thickening agent, preservative, antioxidant, nutrient and flavoring agents, depending on the desired consistency, richness of flavor and texture. Nutrients and flavors can be further provided in a form of herbal extracts or mixes of extracts.

Following these lines, three types of formulations have been developed so far: a toothpaste formulation, a mouthwash and an oral spray. These formulations can be generally characterized as having the following constituents:
  the two actives Dead Sea salt and cannabinoids (e.g., CBD or CBG) at the concentration of about 0.2% and 0.01%, respectively (w/w),
  a humectant as at least one of glycerol (glycerin), propylene glycol, butylene glycol, sorbitol and/or a polyethylene glycol (PEG) or a derivative thereof such as PEG-40 hydrogenated castor oil,
  a surfactant as at least one of a carboxylic acid surfactant, lauryl glucoside, sodium lauryl sarcosinate (INCI),
  a thickening agent as at least one of a carbomer, a cellulose derivative, a preservative as at least one of a phosphate derivative, a sorbate salt, a glyceryl ether, a benzoate salt or acid,
  an antioxidant as at least one of glutathione (GSH), N-acetyl-cysteine (NAC),
  a mineral or a salt as at least one of zinc sulphate monohydrate, a bicarbonate salt
  an abrasive agent is at least one of silica or a derivative thereof,
  a nutrient is at least one of an amino acid or a derivative thereof, curcumin, piperine, resveratrol, an essential oil, a herbal extract, and
  a flavoring agent is at least one of peppermint, spearmint, menthol, a fruit flavor, a natural or an artificial sweetener.

Specific effects and advantageousness of such formulations have been demonstrated in Example 4.

Example 2

2.1 Effectiveness of Cannabinoids as Antimicrobial Agents on Dental Plaque

Preliminary findings on the antimicrobial effects of cannabinoids on oral and dental flora were revealed in a preliminary case study. A sample of dental biofilm/plaque was obtained, plated and cultured for 2 days at 37° C. in the presence of two types of cannabinoids, CBD and CBG, and Chlorhexidine (CHG) as a reference antimicrobial agent. The results are shown in FIG. 1, wherein CBG and CHG saturated zones had a lesser bacterial growth and the CBD zone had no growth, thus providing the initial evidence for antimicrobial effects of cannabinoids on dental plaque.

Subsequently, in a more extended in vitro trial the effectiveness of cannabinoids was determined in 10 subjects (A-J). Samples of dental flora (plaque) were collected by swabs, scrapes, and were tested on the following panel of cannabinoids and cannabinoid combinations:
  1=CBD
  2=CBD+CBN
  3=CBD+CBN+CBG
  4=CBD+CBN+CBG+CBC
  5=CBD+CBN+CBG+CBC+CBGA
  6=CHG reference antimicrobial agent
  7=control with no antiseptic or antimicrobial agent.

Bacterial sensitivity was determined by conventional methods, e.g., growth on selective media, microscopic fluorescence examination. Results of these experiments are summarized in Table 7 below.

TABLE 7

Cannabinoid sensitivity tests in vitro in various individuals

| Test panel | A | B | C | D | E | F | G | H | I | J |
|---|---|---|---|---|---|---|---|---|---|---|
| 1 | ++ | +++++ | ++++ | + | +++ | - | +++++ | ++ | -- | -- |
| 2 | + | ++++ | -- | ++ | ++++ | +++ | -- | -- | +++ | ++ |
| 3 | +++ | -- | + | + | -- | -- | ++++ | ++ | +++ | -- |
| 4 | + | +++ | +++++ | ++++ | ++++ | ++++ | ++++ | ++ | ++++ | ++ |
| 5 | ++++ | - | +++ | ++++ | +++ | ++ | ++ | +++++ | ++++ | ++ |
| 6 | ++ | ++ | + | ++ | -- | -- | +++ | + | ++ | -- |
| 7 | -- | -- | -- | -- | -- | -- | -- | -- | -- | -- |

Increasing scores (+) indicate an increased suppression of bacterial flora

These results demonstrate dramatic impact of various cannabinoids and cannabinoid combinations on the suppression of dental flora in vitro. Combinations of cannabinoid were more effective. This is particularly unexpected since advantageousness of specific combinations of cannabinoids could not be inferred from previous studies.

These data further indicate that the extent of cannabinoid impact was heterogeneous and varied among individuals. For example: the most effective panel of cannabinoids in subject C was panel 4 (CBD+CBN+CBG+CBC), unlike subjects B and H; in patient H the most effective was panel 5 (CBD+CBN+CBG+CBC+CBGA); and in patient B was panel 1 (CBD). These results clearly demonstrate that oral flora from different patients have different sensitivities to cannabinoids and cannabinoid combinations.

In this connection it should be noted that in many individuals CBD alone was found to be sufficiently effective, and also the combination of panel 4 (CBD+CBN+CBG+CBC).

2.2 Specific Effects of Cannabinoids and Cannabinoid Combinations on Gum Disease The effects of cannabinoids on gum disease was further investigated in a series of subjects with various degrees of gingivitis (an earliest and mildest form) or periodontitis (full-fledged gum disease), the severity of gum disease was further evaluated using Dutch Periodontal Screening Index (DPSI).

Samples of gingival plaque were obtained from 6 subjects (A-F) with various degrees of gum disease, samples were plated and cultured for 2 days at 37° C. in the presence of various cannabinoids and cannabinoid combinations. The results are shown in FIG. 2 and Table 8 below.

TABLE 8

Cannabinoids effects on gingival plaque in vitro in various individuals

| Subjects | Characteristics of gum disease | DPSI score | Relative effectiveness |
|---|---|---|---|
| A | Moderate gingivitis | 1 | CBG > CBGA > CBN ≈ CBC |
| B | No gingivitis and no pathology | 0 | POM ≈ POM form. ≈ CBD > CBD form. |
| C | Periodontitis | -3 | CBC > CBG > CBD > CBN |
| D | Moderate gingivitis | 2 | CBGA > CBC > CBG ≈ CBN |
| E | Advanced periodontitis | +3 | CBG ≈ CBGA > CBC > CBD |
| F | Moderate gingivitis | 1 | CBC > CBG ≈ CBGA ≈ CBD |

POM = pomegranate oil;

form. = formulation

This relatively limited study suggests that CBG and CBG derivatives (CBGA) could be potential candidates for targeting moderate to severe gum disease in certain patients. Still there was an obvious interindividual variability in the effectiveness of cannabinoids on gum disease, as CBC was also found effective in certain patients.

2.3 Personalized Treatment of Dental Plaque with Specific Cannabinoids

Figure 3:
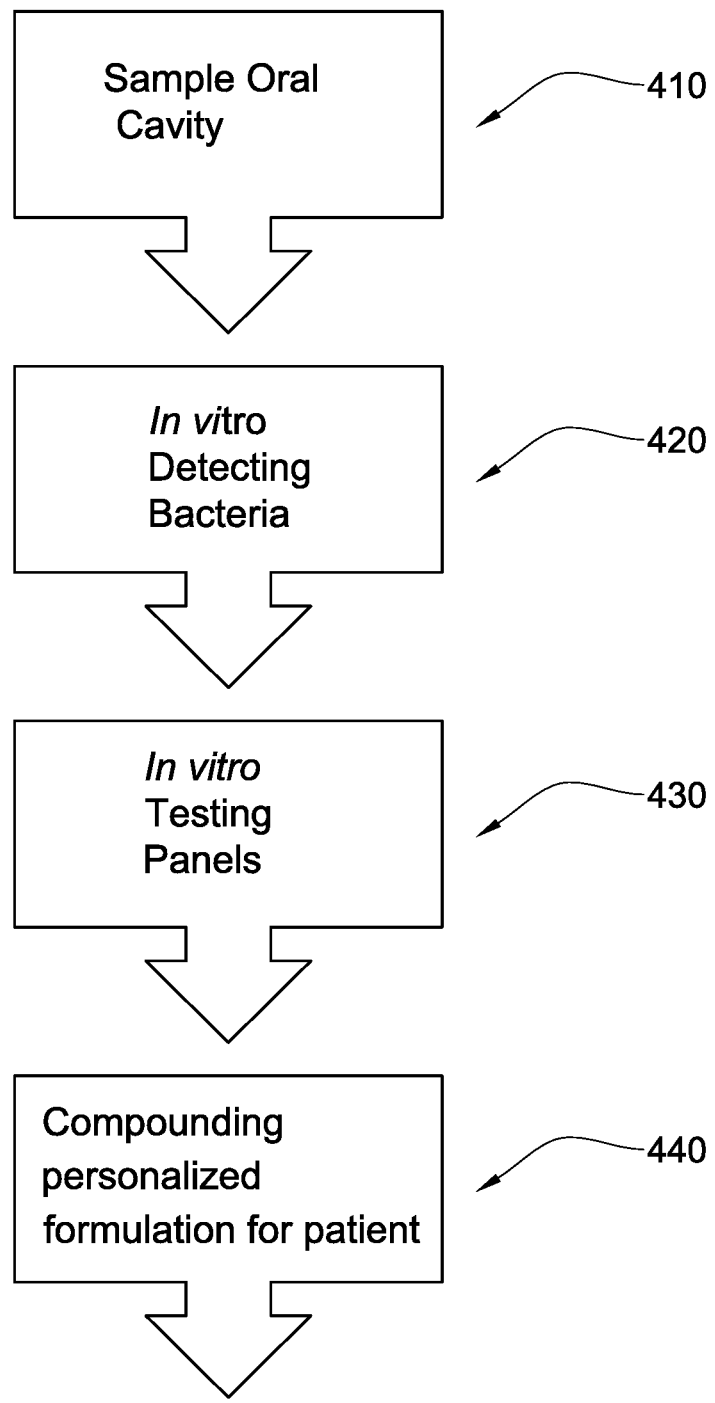
FIG. 3 illustrates personalized methods of the invention, whereby a sample of oral flora (e.g. gingival or dental plaque) is obtained from an individual (410) and tested in vitro (420) on a testing panel including various cannabinoids (430), thus leading to elucidation of individual sensitivities to specific cannabinoids (440), and design of respective personalized formulations with the most effective cannabinoids or cannabinoid combinations.

The above findings support the relevance of cannabinoids for personalized treatments using specifically tailored formulations with specific composition of actives that had proven to be effective as per prior in vitro testing of the same individual (Example 2.1 above). A general outline of such personalized methods is provided in FIG. 3, whereby:

In step '410—a sample of oral flora is obtained from each individual,
In step '420—the sample is tested in vitro on a panel of cannabinoids,
In step '430—the most cannabinoids and cannabinoid combinations are determined,
In step '440—these specific cannabinoids and combinations are incorporated to produce personalized formulations matching the individual sensitivities.

The feasibility of the personalized methods of the invention was further assessed in vivo in subjects A-J previously tested for individual sensitivities in Example 2.1. The overall study period was 6 weeks. During the first 3 weeks subjects used formulations (toothpastes) with no cannabinoids, and in the next 3 weeks they used customized formulations with specific cannabinoid combinations according to their individual sensitivities (see Table 7). The results are shown in Table 8 below.

TABLE 9

Personalized treatment with specific cannabinoids

| Patients | A | B | C | D | E | F | G | H | I | J |
|---|---|---|---|---|---|---|---|---|---|---|
| Panel Score | 5 | 1 | 4 | 4 | 2 | 4 | 1 | 5 | 2 | 2 |
|  | + | + + + + | - - | + + | + + + + | + + + | - - - - | + + + + | + + |

First, the above findings were entirely consistent with the previous in vitro trial. Second, they clearly show that the personalized formulations and methods of the invention are successful, even in a small number of tested individuals.

Example 3

Methods of the Invention Using Cannabinoids in Combination with Blue Light Technology In a series of experiments ex vivo a blue light device (irradiation at about 390 nm to about 500 nm) was applied on samples of plaque from different subjects, with and without concurrent application of CBD. Visual assessment and bacterial count (viability test CFU) were performed before and after treatment. Results of these experiments are summarized in Table 10 below:

TABLE 10

Ex vivo experiments with the combination of blue light and CBD

| Treatment | Visual assessment | Viability test CFU |
|---|---|---|
| Control | ++++++++++++ | ++++++++++++ |
| Blue light (390 nm to 500 nm) | +++++++++ | ++++++++ |

TABLE 10-continued

Ex vivo experiments with the combination of blue light and CBD

| Treatment | Visual assessment | Viability test CFU |
|---|---|---|
| CBD | ++++ | ++ |
| CBD + Blue light | - | -/+ |

These results point to the following:
The blue light has a destructive effect on bacterial plaque.
The blue light or CBD, alone, reduce the viability of bacteria.
The combination of CBD and the blue light has a significant additive or synergistic effect on the bacterial count and viability.

In a subsequent trial, 40 individuals with moderate stage gingivitis were treated with the blue light applied in sessions of 10×5 minute during 3 weeks, with or without CBD. Bacterial count was evaluated as above, and the severity of gingivitis determined by symptoms of gum bleeding, pocket depth, severity of inflammation. The results are summarized in Table 11 below:

TABLE 11

In vivo experiments with the combination of blue light and CBD

| Treatment | Visual assessment | Viability test CFU | Gingivitis |
|---|---|---|---|
| Control | ++++++++++++ | ++++++++++++ | ++++++++++++ |
| Blue light (as in Table 5) | +++++++++ | ++++++++ | +++++++++ |
| CBD | ++++ | ++ | +++++ |
| CBD + Blue light | - | -/+ | -/+ |

These results show, now in vivo, that that the blue light or CBD, as an exemplary cannabinoid, have mitigating effect on gingivitis, but their combination has a significantly more effective and synergistic impact on the bacterial load and gingivitis.

Example 4

Figure 4:
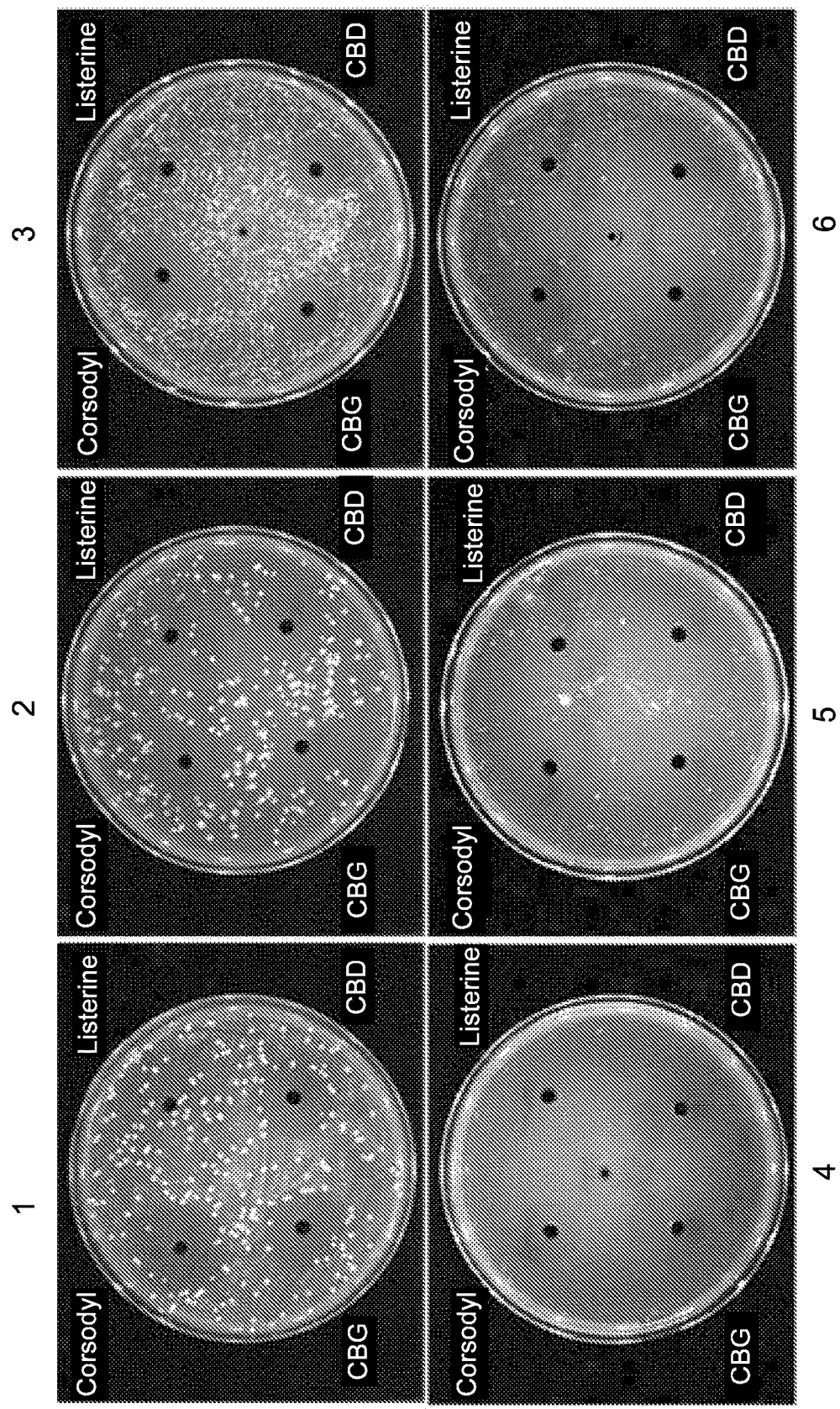
FIG. 4 illustrates the impact of the Dead Sea salts and cannabinoids combinations in various individuals. Samples of gingival plaque were obtained from six individuals (1-6), samples were plated in the presence of Dead Sea salts (DDS) 0.2% (w/w) and CBD or CBG 0.01% (w/w) combinations, Listerine or Corsodyl applied into distinct wells, and cultured as above. The results as subjects' DPSI (Dutch Periodontal Screening Index) and diameter of the inhibition zone (mm) are summarized in Table 12 in Example 4.

Comparative Effects of the Dead Sea Salts/Cannabinoids Combination Vs. Known Antiseptics Superior effects of the Dead Sea salts and cannabinoid combinations were demonstrated in a number of studies. Samples of gingival plaque were obtained from 6 individuals with various degrees of gum disease, the severity of gum disease was evaluated using DPSI. Samples were plated in the presence of Dead Sea salts (DDS) 0.2% (w/w) and CBD or CBG 0.01% (w/w) combinations, Listerine or Corsodyl (a gold standard antiseptic) applied into distinct wells, and cultured for 2 days at 37° C. The results are shown in FIG. 4 and Table 12 below.

TABLE 12

Effects of DDS/CBD or CBG combinations in various individuals

| Subjects | Gender | Age | DPSI | Listerine | Corsodyl | DSS 0.2% CBD 0.01% | DSS 0.2% CBG 0.01% |
|---|---|---|---|---|---|---|---|
| 1 | M | 48 | −3 | 0 | 21-23 | 21 | 21 |
| 2 | M | 83 | −3 | 0 | 21 | <20 | <20 |
| 3 | M | 27 | 4 | 0 | 19 | 17 | 17-18 |
| 4 | F | 49 | 2 | 0 | 16 | 20-22 | 15-18 |
| 5 | M | 47 | 2 | 0 | 25 | 25 | 24 |
| 6 | F | 38 | 2 | 0 | 20 | 19-21 | 18-22 |

Inhibition zone (mm) after 2 days incubation

DPSI Dutch Periodontal Screening Index for screening of the periodontal condition;
DDS Dead Sea salts These results demonstrate that the antiseptic or antimicrobial effects of the Dead Sea salts and CBD/CBG combinations on the gingival plaque, as established by the diameter of the inhibition zone, were comparable to the effect of Corsodyl, and both of them were far more superior than Listerne, being one of the most commonly used antiseptics for oral care.

The results further show that the above effect can be achieved with combinations comprising low concertation of Dead Sea salts and cannabinoids, as low as 0.2% and 0.01% (w/w), respectively. This latter is particularly surprising, and may suggest a synergy of action.

Figure 5:
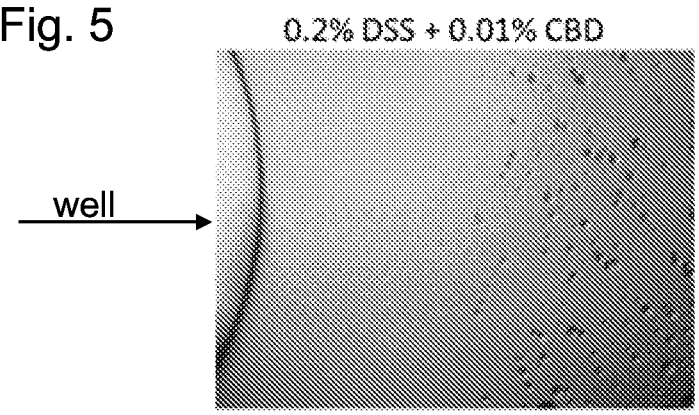
FIG. 5 illustrates the effects of Dead Sea salts 2% or 0.2% and CBD 0.01% (w/w) combinations on gingival plaque as revealed in microscopic images (×40) of plate wells. The results as diameter of the inhibition zone (mm) are summarized in Table 13 in Example 4.
Figure 5:
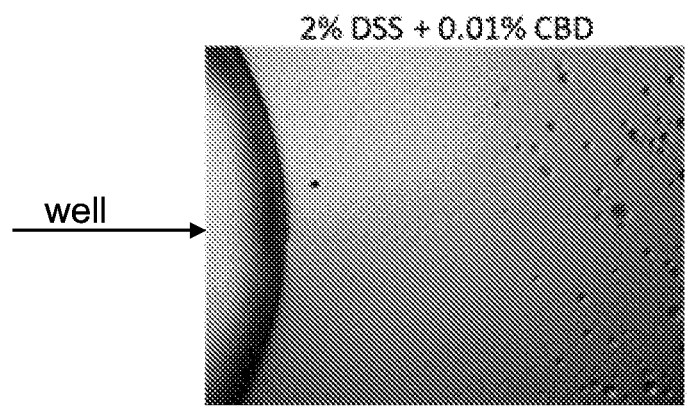

The effects of various combinations of Dead Sea salts 2% or 0.2% and CBD 0.01% (w/w) on gingival plaque were further evaluated under the microscope magnitude ×40. The experiments were conducted as above. The results are shown in FIG. 5 and the respective diameters of inhibition zone in Table 13 below.

TABLE 13

Effects of various combinations of DDS and CBD on gingival plaque

| Combinations | Inhibition zone (mm) |
|---|---|
| 0.2% DSS + 0.01% CBD | 8-9 |
| 2% DSS + 0.01% CBD | 8-9 |

This result suggests that the above observed effects can be achieved with the same degree of success with 0.2% and 2% Dead Sea salts (w/w). In other words, the synergistic effect of the Dead Sea salts and cannabinoids on oral microflora affords use of significantly lower concertation of the two components.

Figure 6:
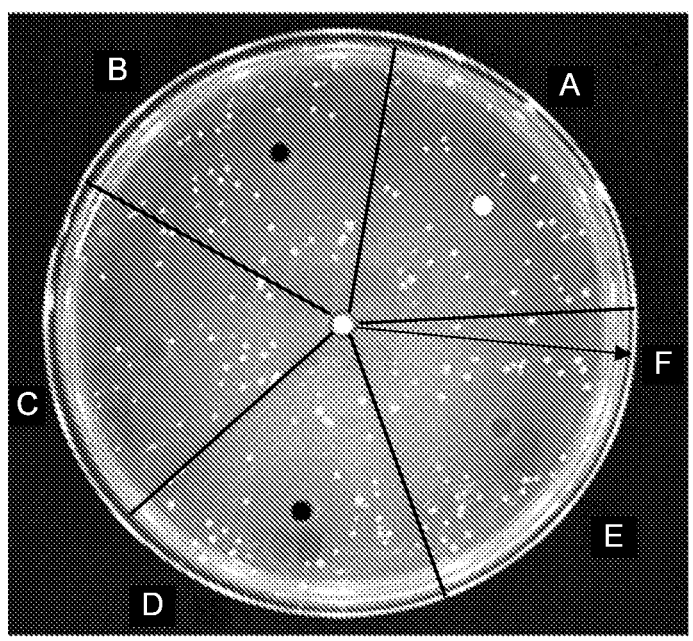
FIG. 6 demonstrates comparative effects of various Dead Sea salts (DSS) and cannabinoids (CBD or CBG) combinations vs. Listerine or Corsodyl, or Listerine and cannabinoid combinations in a single patient (key to the wells A: Listerine; B: Listerine+CBD; C: Listerine+CBG; D: DSS+CBD; E: DSS+CBG; F center: Corsodyl). Applications and incubation conditions were as in FIG. 4 above. The results as diameter of the inhibition zone (mm) are summarized in Table 14 in Example 4.

The synergistic effect was further evaluated in terms of specificity using combinations of Dead Sea salts with cannabinoids (CBD or CBG) and Listerine with cannabinoids vs. Listerine or Corsodyl alone. The experiments were conducted as above in a single patient. The results are shown in FIG. 6 and the respective diameters of inhibition zone in Table 14 below.

TABLE 14

Effects of various combinations of DDS and CBD/CBG and Listerine

| Combinations | Inhibition zone (mm) |
|---|---|
| Listerine | 0 |
| Listerine + CBD | 0 |
| Listerine + CBG | 0 |

TABLE 14-continued

Effects of various combinations of DDS and CBD/CBG and Listerine

| Combinations | Inhibition zone (mm) |
|---|---|
| DSS + CBD | 17 |
| DSS + CBG | 17 |
| Corsodyl | 17 |

The results show that the synergistic effect of the Dead Sea salts and cannabinoids combinations is highly specific, and cannot be reproduced with combinations of cannabinoids and other antiseptics, for example.

Overall, these results point to the improvement of oral and/or dental hygiene and minimization of harmful dental and gingival microflora on individual level and groups, which can be related specifically to the formulations of the invention, and as result improvement of the healthy appearance of teeth and gums by these formulations.

The invention claimed is:

1. An oral formulation for improving oral and/or dental hygiene, and/or for enhancing the healthy appearance of teeth and gums, the formulation comprises Dead Sea salt and at least one synthetic, semi-synthetic or natural cannabinoid, a precursor, a derivative, or any combination thereof, or an extract of a cannabis plant,
   wherein said Dead Sea salt is being provided at a weight concentration of up to 0.2% (w/w) and said at least one synthetic, semi-synthetic or natural cannabinoid, the precursor, the derivative, the combination, or the extract of a cannabis plant is being provided at a weight concentration of up to 0.01% (w/w), and
   wherein said improving oral and/or dental hygiene, and/or said enhancing the healthy appearance of teeth and gums further comprises a reduction in the population of harmful microflora in the oral cavity, teeth or gums, said microflora being bacteria, fungi, viruses or a combination thereof.

2. The formulation of claim 1, wherein said enhancing the healthy appearance of teeth and gums further comprises teeth whitening.

3. The formulation of claim 1, wherein said improving oral and/or dental hygiene further comprises removal of dental and/or gingival plaque, and/or dental canal therapy.

4. The formulation of claim 1, further comprising at least one agent from at least one of the following groups: a humectant, a thickening agent, an alcohol, a whitening agent, a pigment, a flavoring agent, a preservative, a nutrient, fluoride.

5. The formulation of claim 4, wherein the least one humectant is a cellulose derivative or a polyethylene glycol (PEG), the least one thickening agent is apolyvinylpyrrolidone (PVP), the least one alcohol is ethanol, the least one whitening agent is hydrogen peroxide with or without ethanol, and the least one pigment is titanium dioxide.

6. The formulation of claim 1, further comprising at least one agent from at least one of the following groups: a humectant, a surfactant, a thickening agent, an abrasive agent, a preservative, a mineral or a salt, an antioxidant, a nutrient, a whitening agent, a flavoring agent, a pigment, fluoride.

7. The formulation of claim 6, wherein
the humectant is at least one of glycerol (glycerin), propylene glycol, butylene glycol, sorbitol and/or a polyethylene glycol (PEG) or a derivative thereof such as PEG-40 hydrogenated castor oil,
the surfactant is at least one of a carboxylic acid surfactant, lauryl glucoside, sodium lauryl sarcosinate (INCI),
the thickening agent is at least one of a caibomer, a cellulose derivative, the at least one preservative is at least one of a phosphate derivative, a sorbate salt, a glyceryl ether, a benzoate salt or acid,
the antioxidant is at least one of glutathione (GSH), N-acetyl-cysteine (NAC),
the mineral or salt is at least one of zinc sulphate monohydrate, a bicarbonate salt,
the whitening agent is at least one of a bicarbonate salt, carbamide,
the abrasive agent is a silica or a derivative thereof,
the nutrient is at least one of an amino acid or a derivative thereof, curcumin, pipeline, resveratrol, an essential oil, a herbal extract, and
the flavoring agent is at least one of peppermint, spearmint, menthol, a fruit flavor, a natural or an artificial sweetener.

8. The formulation of claim 1, further comprising glycerol, citric acid monohydrate, HPMC, disodium phosphate, potassium sorbate, glutathione, sodium saccharinate, a peppermint flavoring agent and at least one essential oil.

9. The formulation of claim 1, further comprising at least one agent from at least one of the following groups: an abrasive agent, whitening agent, an antioxidant an antiseptic or antimicrobial agent used in dentistry and a nutrient.

10. The formulation of claim 9, wherein the at least one agent is at least one of the following:
the abrasive and/or whitening agent is sodium bicarbonate, calcium carbonate or dicalcium phosphate,
the antioxidant is GSH, tumeric or NAC,
the antiseptic or antimicrobial agent is chlorhexidine gluconate (CHG) or fluoride, and the nutrient is curcumin, piperine or resveratrol.

11. The formulation of claim 1, wherein the at least one cannabinoid is cannabidiol (CBD) or cannabigerol (CBG), cannabichromene (CBC), cannabinol (CBN), cannabidivarin (CBCV), cannabidiolic acid (CBDA), cannabigerolic acid (CBGA), or a derivative, a precursor or any combination thereof.

12. A method for improving oral and/or dental hygiene, and/or enhancing the healthy appearance of teeth and gums, the method comprising administering to a subject an oral formulation of claim 1, wherein said improving oral and/or dental hygiene, and/or said enhancing the healthy appearance of teeth and gums further comprises a reduction in the population of harmful microflora in the oral cavity, teeth or gums, said microflora being bacteria, fungi, viruses or a combination thereof.

13. The method of claim 12, wherein said enhancing the healthy appearance of teeth and gums further comprises teeth whitening.

14. The method of claim 12, wherein said improving oral and/or dental hygiene further comprises a removal of dental and/or gingival plaque, and/or dental canal therapy.

15. The method of claim 12, wherein said formulation is administered to the subject in conjunction with blue light irradiation at a wave length in range of about 390-500 nm, the blue light irradiation is being administered on the whole mouth or a localized area, simultaneously with or in succession to the formulation.

16. The method of claim 12, wherein said formulation is administered to the subject on an ultrasonic tooth polishing devices, with or without peroxide water.

* * * * *